United States Patent [19]

Halliday

[11] Patent Number: 5,026,571
[45] Date of Patent: Jun. 25, 1991

[54] CHEMICALLY TREATING FORAGE

[75] Inventor: Leslie J. Halliday, Charlottetown, Canada

[73] Assignee: Her Majesty The Queen in right of Canada as represented by the Minister of Agriculture Canada, Canada

[21] Appl. No.: 476,775

[22] Filed: Feb. 8, 1990

[51] Int. Cl.$^5$ .............................................. A23K 1/00
[52] U.S. Cl. .................................. 426/636; 426/69; 426/626; 426/807
[58] Field of Search ................. 426/69, 626, 636, 807; 127/37

[56] References Cited

U.S. PATENT DOCUMENTS

| | | | |
|---|---|---|---|
| 4,600,590 | 7/1986 | Dale | 426/807 |
| 4,649,113 | 3/1987 | Gould | 426/807 |
| 4,774,098 | 9/1988 | Gould | 426/807 |
| 4,806,475 | 2/1989 | Gould | 127/37 |
| 4,842,877 | 1/1989 | Tyson | 426/807 |

Primary Examiner—R. B. Penland
Attorney, Agent, or Firm—Venable, Baetjer, Howard & Civiletti

[57] ABSTRACT

The effect of different chemical treatments applied to barley straws, timothy and alfalfa hays were determined. Treatments consisted of four concentrations of hydrogen peroxide (3%, 5%, 7% and 9%) in combination with 4% ethanolamine with or without the addition of sodium hydroxide, which was added to increase the pH. The ability of each treatment to improve the nutritive value of the forage and their effect on rumen function was ascertained.

7 Claims, 1 Drawing Sheet

CHEMICALLY TREATING FORAGE

BACKGROUND OF THE PRIOR ART

The present invention provides a method of chemically treating forage to improve the nutritive value of the forage.

Poor quality forages are characterized by their high fibre and low crude protein contents. This not only includes the various types of hay but also cereal straws which represent a substantial supply of potentially digestible nutrients for ruminant animals. It is generally accepted that the cell walls of plants are a complex structure of fibrillar elements embedded in an 'amorphous' matrix and that the whole structure is held together by chemical bonds between many different types of polymers. The digestion of these polymers by rumen microbes will depend not only on the type of polymer present but also on the association between them. The types of microbes found in the rumen can be classified into three major groups: bacteria, protozoa and fungi.

Energy from plant carbohydrates is used by the microbes for growth, the by-products of this process are fatty acids (acetic, propionic, butyric and others), which are absorbed from the rumen into the animal's blood stream. Acetic acid and butyric acid must be used directly by the animal to produce its own energy for maintenance and growth. Propionic acid can be used to build storage polysaccharides which can be used by the animal later in life. Propionic acid is also utilized more efficiently than the other acids and this has led to concepts of rumen manipulation to improve efficiency of feed utilization by increasing the proportion of propionic acid. The microbes themselves are a rich source of minerals, vitamins, energy and protein. As they pass into the acidic environment of the true stomach (abomasum) they rupture and release nutrients which are quickly utilized by the animal. Energy is no doubt important, but for the microbes to capture it they also require nitrogen. Nitrogen enters the rumen in different forms and is degraded to various degrees by microbial enzymes into peptides, amino acids, and ultimately ammonia. Ammonia is used to build microbial protein and this process requires energy. The synchronization of energy and nitrogen availability cannot be overstressed. If energy is in short supply the ammonia concentration in the rumen rises in excess of requirements. Much of this excess ammonia passes across the rumen wall into the blood stream and is transported to the liver where it is converted to urea, a variable proportion of which is recycled, to the rumen via the saliva. Alternatively, if nitrogen is limiting, microbial growth and reproduction will be severely curtailed and result in a slow and inefficient digestion. Although supplementation with protein or non-protein nitrogen can increase animal performance, an increase in the supply of readily digestible cell walls would also be an extra benefit.

Methods of treating straw with alkali were known by the beginning of the 20th century. In 1922, Ernest Beckman developed a "wet" process for treating forage with a low concentration of sodium hydroxide. R.K. Wilson and W.J. Pidgen (Can. . Anim. Sci. 44: 122-123, 1964) developed a dry process where concentrated NaOH was sprayed onto the forage which was then neutralized with organic acid. Other methods of chemical treatment have been pursued, including:

a) potassium hydroxide (R.R. Spencer et al, 1984, Agron. J. 76: 819–824);

b) selected organic acid and base (U.S. Pat. No. 4,082,859);

c) organic waste ash (E.A. Adebowale, 1985, Anim. Feed Sci. Tech. 13: 237-248);

d) ozone (G. Shefet and D. Ben-Ghedalia, 1982, Eur. J. Appl. Microbio. Biotechnol. 15: 47-51);

e) ammonia (R.N. Gates et al, 1987, J. Anim. Sci. 64: 1821–1834; M.J. Lawlor and J. O'Shea, 1979, Anim. Feed Sci. Tech. 4: 169-175; P.J. Van Soest et al, 1984, Anim. Feed Sci. Tech. 10: 155-164);

f) sulphur dioxide (G.McL. Dryden and R.A. Leng, 1986, Anim. Feed Sci. Tech. 14: 41-54);

g) alkaline hydrogen peroxide (M.J. Gould and S.N. Freer, 1984, Biotech. Bioeng. 26: 628-631; S.M. Lewis et al, 1987, Anim. Feed Sci. Tech. 17: 179-199);

h) primary amines (F. Laurent et al, 1985, Anim. Feed. Sci. Tech. 13: 131-140);

i) acified dioxane (U.S. Pat. No. 3,937,849);

j) urea and urea phosphate (U.S. Pat. No. 3,937,846);

k) diethanolamine triacetic acid triamides (U.S. Pat. No. 4,800,213); and l) $\alpha$-haloacetamides (U.S. Pat. No. 3,564,099). All the above methods have been shown to improve the feeding value of poor quality forages but each has its limitations. For example, ammonia, ozone and sulphur dioxide are difficult to handle. The alkali NaOH and alkaline hydrogen peroxide greatly improve the availability of cell wall carbohydrates. If the ruminant is to make use of this extra carbohydrate it follows that extra nitrogen must be supplied in the diet. In this regard, compounds which improve the availability of cell wall carbohydrates in addition to providing nitrogen are disclosed in the present invention.

Specifically, hydrogen peroxide in combination with ethanolamine or another non-toxic amine with or without the addition of sodium hydroxide was found to be preferred. This combination of compounds provides an unexpected improvement over the prior art combinations in that when used according to the invention, it gives an in sacco improvement in the fiber digestion of certain forages and thus improves their nutritive value.

SUMMARY OF THE INVENTION

According to the present invention there is provided a method of improving the nutritive value of forage comprising treating the forage with a composition comprising hydrogen peroxide and a non-toxic amine and incubating the treated forage for a period of from one to five days.

In another embodiment of the present invention, there is provided a method of improving the nutritive value of forage comprising treating the forage with a composition comprising hydrogen peroxide, a selected amine and sodium hydroxide and incubating the treated forage for a period of from one to five days.

Further according to the present invention there is provided a method of treating the forage with a composition comprising hydrogen peroxide, a non-toxic amine selected from the group as defined hereinafter, and optionally sodium hydroxide the composition being applied at a rate: 0.3–9.0 g of $H_2O_2$, 0.2–6.0 g of the amine and, when used, 0.1–2.5 g of NaOH per 100 g of forage.

Further according to the present invention there is provided a composition comprising 0.3–9.0% hydrogen peroxide and 0.2–6% amine.

In another embodiment of the present invention, there is provided a composition comprising 0.3-9% hydrogen peroxide, 0.2-6% amine and 0.1-2.5% sodium hydroxide.

All the percentages indicated herein are by weight.

DETAILED DESCRIPTION OF THE INVENTION

Figure 1:
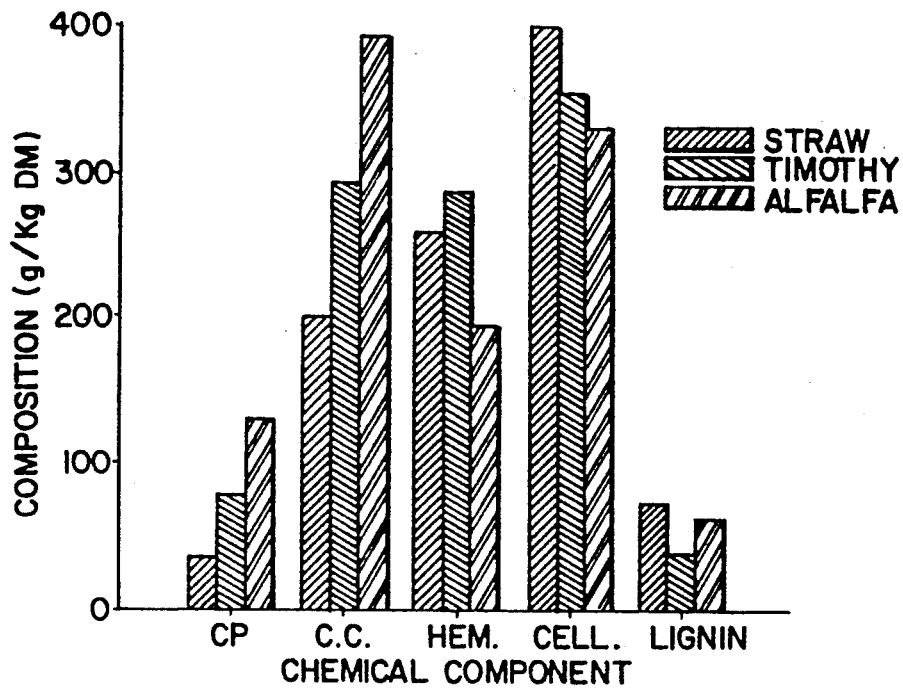
FIG. 1 shows the chemical composition of the three forage types: straw, timothy and alfalfa.

The present invention provides a method of chemically treating forage to improve the nutritive value of the forage. Specifically the novel combination of chemicals used in the present invention comprises hydrogen peroxide and a selected amine with or without sodium hydroxide.

The concentration of chemicals tested in the present invention was 3-9% hydrogen peroxide, 4% ethanolamine and 1.5% (15 g/l) of sodium hydroxide (when added), the balance being water. The chemical additives were applied at two rates: 10 ml of solution for 100 g of forage, and 100 ml of solution for 100 g of forage. Therefore, the range of chemicals added per 100 g of forage was 0.3-9.0 g of hydrogen peroxide; 0.4-4.0 g of ethanolamine and, when used, 0.15-1.5 g of sodium hydroxide.

A wide range of forage types can be used in this invention. The most significant improvement in degradability was with straw but it should be noted that this invention also relates to the treatment of hay and furthermore relates to the treatment of all types of lignocellulosic material.

In the tests conducted for the purpose of the present invention, ethanolamine was the only amine used. However, it is reasonable and safe to assume that any amine which has basic properties (alkalinity) can also be used, provided it is non-toxic. Specifically the following amines are considered equivalent to ethanolamine for the purpose of the present invention:

| | |
|---|---|
| glycine | triethylenediamine |
| 1-amino-2-propanol | triethanolamine |
| diethanolamine | triethylenetetramine |
| diethylamine | tributylamine |
| ethylenediamine | propylamine |
| ethylamine | propanediamine |
| triethylamine | |

In the present invention the chemicals were added to the forage in liquid form. However, dry processes of chemical treatment of forage are known in the art and therefore it is within the scope of this present invention to add the chemicals in such a dry process.

Other hydroxides, e.g. potassium and calcium, may be substituted for sodium hydroxide. However, sodium hydroxide has been found by far the most effective.

The following example illustrates the invention, and should not be construed as limiting the invention in

EXAMPLE 1

Chemical Pretreatment and In sacco Treatment of Forages

The chemical treatments applied to the forages were designed to examine the effects of different concentrations of hydrogen peroxide in combination with 4% ethanolamine solution, applied at different rates with or without the addition of sodium hydroxide (NaOH). The treatments were as shown in Table 1.

TABLE 1

1. Control untreated
2. 3% HP[a], 4% ethanolamine, low rate[b] [3HPETLR]
3. 3% HP, 4% ethanolamine, high rate[c] [3HPETHR]
4. 5% HP, 4% ethanolamine, low rate [5HPETLR]
5. 5% HP, 4% ethanolamine, high rate [5HPETHR]
6. 7% HP, 4% ethanolamine, low rate [7HPETLR]
7. 7% HP, 4% ethanolamine, high rate [7HPETHR]
8. 9% HP, 4% ethanolamine, low rate [9HPETLR]
9. 9% HP, 4% ethanolamine, high rate [9HPETHR]
10. 3% HP, 4% ethanolamine + 15 g NaOH/l low rate [3AHPLR]
11. 3% HP, 4% ethanolamine + 15 g NaOH/l high rate [3AHPHR]
12. 5% HP, 4% ethanolamine + 15 g NaOH/l low rate [5AHPLR]
13. 5% HP, 4% ethanolamine + 15 g NaOH/l high rate [5AHPHR]
14. 7% HP, 4% ethanolamine + 15 g NaOH/l low rate [7AHPLR]
15. 7% HP, 4% ethanolamine + 15 g NaOH/l high rate [7AHPHR]
16. 9% HP, 4% ethanolamine + 15 g NaOH/l low rate [9AHPLR]
17. 9% HP, 4% ethanolamine + 15 g NaOH/l high rate [9AHPHR]

[a] hydrogen peroxide
[b] 10 ml solution/100 g forage
[c] 100 ml solution/100 g forage The pH of the various solutions not containing NaOH ranged from 10.3-10.8. Sodium hydroxide was added to increase pH to 11.5 which has been reported (Gould and Freer, 1984, op.cit.) to be the optimum pH for reaction with cell wall polymers. However, the operative pH range is 8-12.

The forages used were alfalfa hay, timothy hay, and barley straw. Four bales of each forage were selected and samples from each of the four bales of each forage were taken, pooled and mixed. A subsample weighing 300 g was placed in a large plastic drum and sprayed, using a 1 liter hand sprayer with the appropriate treatment. The drums were covered with plastic sheets for three days, after which the forages were milled through a hammer mill fitted with a 4.0 mm screen. For the forage treated at the high rate of application it was necessary to remove surface moisture to facilitate milling. This was done by placing the drums in an oven for three hours at 60° C.

The chemical composition of the forages were very different from each other (see FIG. 1). Straw is a poor quality forage with cell wall constituting 80% of the dry matter, crude protein (CP) of only 37 g/kg (3.7%) and high lignin content. In contrast, alfalfa contained 60% cell wall and 130 g/kg CP but lignin was fairly high at 63 g/kg. Timothy was between straw and alfalfa as might be expected.

The artificial bag (in sacco) technique was used to assess the treatment of forages for nutritive value. The bags were constructed of nylon mesh with an average pore size of 53 μm. The bags were weighed (B) and approximately 5 g of sample were placed in each bag. The bags were re-weighed (BS) and attached randomly to a 45 cm length of semi-rigid nylon tubing (stalks). With each of three Jersey cows, two stalks, each carrying one bag of each sample hay were incubated in their rumen according to the complete exchange method of Paine et al (Occ. Publ. Br. Soc. Anim. Prod. No. 6, 1982) for each period of 4, 8, 16, 24 and 48 hours. This gave six measurements of degradation at each period.

The stalks were removed at the end of each time period, immersed in a tank of cold tap water for 5 minutes and then each bag was removed and rinsed under cold running water until the water was clear. Washed bags were dried at 80° C. for 48 hours, cooled in a desiccator and then re-weighed to give DW.

The dry matter degradation was calculated as follows:

$$\text{Dry matter degradation} = 100 - \left[\left(\frac{DW - B}{DM(BS - B)}\right) \times 10^4\right]$$

where DM is the dry matter of the starting sample forage.

ANALYSIS

(A) Chemical Analysis

Sequential cell fractionation was carried out according to the method of Van Soest (Nutritional ecology of the ruminant, 0&B Books Inc., Corvallis, Oregon, 1982) and modified by Halliday (Studies of rumen degradation in relation to the utilization of forage, Ph.D. Thesis, University of Wales, Bangor, Wales, U.K., p. 61–65, 1985) as illustrated below.

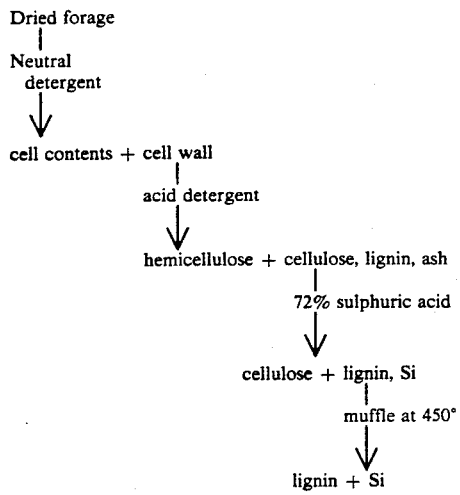

The Kjeldahl method of nitrogen determination (Association of Official Analytical Chemists, 1984, Official Methods of Analysis, 14th Ed., AOAC, Washington, D.C., Section 7.057) was used. Percentage nitrogen was converted to percentage crude protein by multiplying nitrogen by the standard Kjeldahl factor of 6.25.

The degradability data was also analysed by analysis of variance (ANOVA) using a GENSTAT ™ statistical package. This experiment consisted of 17 different treatments. The experimental design was a 4×2×2 factorial with a control. This is an unbalanced design and presents some minor problems for analysis. To obtain the most accurate information, the data was analysed in two ways. Firstly, as 17 different treatments with sets of orthogonal contrasts to compare two 'groups' of treatments, where a group can be one or more treatments. For example, control could be compared to the rest of the treatments and the low and high rate of application could be compared against each other. The main interest of this analysis was to gather information concerning the control data.

Secondly, as a factorial experiment with control data omitted. The factorial was 4 concentrations of hydrogen peroxide (3,5,7,9)×2 rates of application (high,low) ×2 additive (with or without NaOH). This type of analysis allowed more detailed investigation about the rate, concentration and additive. Orthogonal contrasts were again used to examine groups of treatments. For example, the concentration effect was broken down into three contrasts −5 vs 3,7,9; 3 vs 7; 7 vs 9.

The effect of treatment on chemical composition is presented in Tables 2, 3 and 4. The mean squares of analysis of variance are presented in Tables 5 and 6.

For cell contents, chemical treatment did not have a significant effect. However, when the analysis was re-run using a factorial design the rate of application was significant. At the high rate of application, cell contents increased on average by 12% compared to the low rate. This could represent solubilization of cell wall components including hemicelluloses, lignin and cellulose.

The results for cell contents (Tables 2, 3 and 4) indicate that the low rates appear to have less cell contents than the control. It is possible that at such low application rates, the buffering capacity of the forage might be great enough to prevent intermediary products from being formed in large quantities. This would reduce cell wall hemicellulose solubilization and possibly reduce the extraction of cell contents in the neutral detergent fiber solution.

TABLE 2

| Treatment | Effect of Treatment of Chemical Composition of Barley Straw | | | | |
|---|---|---|---|---|---|
| | Cell Contents | Hemi-cellulose | Cellulose | Lignin | Crude Protein |
| | | | g/kg DM | | |
| Control | 200 | 260 | 456 | 73 | 37 |
| 3HPET LR | 185 | 273 | 451 | 79 | 43 |
| 3HPET HR | 222 | 292 | 421 | 67 | 78 |
| 5HPET LR | 201 | 286 | 429 | 71 | 46 |
| 5HPET HR | 222 | 292 | 406 | 67 | 78 |
| 7HPET LR | 181 | 328 | 398 | 79 | 41 |
| 7HPET HR | 231 | 298 | 391 | 68 | 78 |
| 9HPET LR | 174 | 312 | 418 | 82 | 47 |
| 9HPET HR | 220 | 284 | 412 | 71 | 81 |
| 3AHP LR | 193 | 314 | 414 | 57 | 55 |
| 3AHP HR | 232 | 293 | 408 | 75 | 81 |
| 5AHP LR | 190 | 307 | 419 | 75 | 41 |
| 5AHP HR | 234 | 284 | 406 | 73 | 82 |
| 7AHP LR | 179 | 308 | 418 | 67 | 42 |
| 7AHP HR | 237 | 280 | 403 | 51 | 75 |
| 9AHP LR | 178 | 288 | 457 | 60 | 48 |
| 9AHP HR | 247 | 252 | 436 | 48 | 93 |
| Mean | 207 | 291 | 420 | 69 | 61 |

TABLE 3

Effect of Treatment of Chemical Composition of Timothy Hay

| Treatment | Cell Contents | Hemi-cellulose | Cellulose g/kg DM | Lignin | Crude Protein |
|---|---|---|---|---|---|
| Control | 295 | 289 | 357 | 39 | 79 |
| 3HPET LR | 293 | 336 | 321 | 34 | 81 |
| 3HPET HR | 316 | 320 | 328 | 35 | 114 |
| 5HPET LR | 288 | 332 | 327 | 31 | 82 |
| 5HPET HR | 309 | 319 | 329 | 30 | 117 |
| 7HPET LR | 275 | 331 | 320 | 39 | 78 |
| 7HPET HR | 312 | 307 | 312 | 35 | 111 |
| 9HPET LR | 257 | 339 | 356 | 35 | 84 |
| 9HPET HR | 300 | 316 | 345 | 33 | 118 |
| 3AHP LR | 281 | 319 | 352 | 37 | 100 |
| 3AHP HR | 312 | 296 | 348 | 34 | 132 |
| 5AHP LR | 294 | 308 | 346 | 38 | 87 |
| 5AHP HR | 314 | 299 | 326 | 39 | 114 |
| 7AHP LR | 280 | 321 | 353 | 40 | 90 |
| 7AHP HR | 328 | 285 | 334 | 31 | 115 |
| 9AHP LR | 274 | 328 | 336 | 31 | 94 |
| 9AHP HR | 289 | 307 | 326 | 32 | 123 |
| Mean | 302 | 310 | 334 | 35 | 101 |

TABLE 4

Effect of Treatment of Chemical Composition of Alfalfa Hay

| Treatment | Cell Contents | Hemi-cellulose | Cellulose g/kg DM | Lignin | Crude Protein |
|---|---|---|---|---|---|
| Control | 393 | 194 | 333 | 63 | 131 |
| 3HPET LR | 410 | 215 | 301 | 64 | 132 |
| 3HPET HR | 430 | 198 | 301 | 56 | 179 |
| 5HPET LR | 417 | 220 | 293 | 76 | 134 |
| 5HPET HR | 429 | 223 | 281 | 50 | 179 |
| 7HPET LR | 381 | 259 | 283 | 65 | 140 |
| 7HPET HR | 425 | 233 | 274 | 57 | 171 |
| 9HPET LR | 367 | 256 | 298 | 63 | 146 |
| 9HPET HR | 400 | 237 | 289 | 61 | 180 |
| 3AHP LR | 395 | 213 | 316 | 62 | 148 |
| 3AHP HR | 415 | 200 | 308 | 65 | 183 |
| 5AHP LR | 393 | 225 | 308 | 60 | 143 |
| 5AHP HR | 441 | 209 | 289 | 53 | 178 |
| 7AHP LR | 400 | 231 | 296 | 60 | 145 |
| 7AHP HR | 422 | 219 | 298 | 51 | 181 |
| 9AHP LR | 404 | 214 | 297 | 62 | 152 |
| 9AHP HR | 413 | 231 | 290 | 56 | 192 |
| Mean | 401 | 227 | 300 | 59 | 159 |

TABLE 5

Mean Squares of Analysis of Variance for Chemical Composition of Treated and Untreated Forages

| Source of Variation | df | Cell Contents | Hemi-Cellulose | Cellulose | Lignin | Crude Protein |
|---|---|---|---|---|---|---|
| Treatment Contrast | 16 | 10.77 | 6.3 | 4.94* | .85 | 10.94*** |
| Control vs Rest | 1 | 1.65 | 25.4* | 30.56*** | .41 | 19.6*** |
| Forage Contrasts | 2 | 1609*** | 325*** | 657*** | 48.4*** | 411*** |
| Straw vs Rest | 1 | 2369*** | 59.5*** | 1214*** | 48.4*** | 536*** |
| Timothy vs Alfalfa | 1 | 849*** | 59.1*** | 101*** | 52.5*** | 286*** |
| Residual | 32 | 8.65 | 5.79 | 2.3 | .74 | .16 |
| CV % | 32 | 9.7 | 8.7 | 4.3 | 15.7 | 3.7 |

*p < 0.05
**p < 0.01
***p < 0.001

TABLE 6

Mean Squares of Analysis of Variance for Chemical Composition of Treated Forages

| Source of Variation | df | Cell Contents | Hemi-Cellulose | Cellulose | Lignin | Crude Protein |
|---|---|---|---|---|---|---|
| Additive | 1 | 2.6 | 15.3* | 8.4* | 2.2 | 4.32 |
| Rate | 1 | 132.9** | 32.4* | 12.4* | 4.2* | 143.0*** |
| Concentration | 3 | 6.7 | 3.2 | 6.7* | .2 | 1.64* |
| Linear | 1 | 12.7 | 6.9 | .49 | .4 | .21 |
| Quadratic | 1 | 7.3 | 1.3 | 17.5** | .1 | 4.2** |
| Cubic | 1 | .3 | 1.4 | 2.1 | .0 | .47 |
| Additive · Rate | 1 | .6 | .5 | .25 | .75 | .29 |
| Additive · Conc | 3 | 2.0 | 3.2 | 2.0 | .99 | .68* |
| Rate · Conc · | 3 | 1.7 | 1.6 | .3 | .6 | .15 |
| Additive · Conc · Forage | 6 | 8.78 | 6.27 | 6.17* | .84 | .09 |
| Residual | 6 | 5.92 | 3.2 | 1.07 | .28 | .17 |
| CV % | 6 | 8.0 | 6.4 | 3.0 | 13.3 | 3.2 |

*p < 0.05
**p < 0.01
***p < 0.001

Preliminary analysis across all forages showed no significant differences in hemicellulose content between treatments. Comparison of control and chemical treatments showed that hemicellulose concentration was greater for the treated forage. Further analysis (Table 6) showed differences in the effects of rate and additive. Calculation of means showed higher hemicellulose in forage treated at the higher rate probably as a result of increased solubilization of cellulose which could have been extracted as part of the hemicellulose fraction. When NaOH is used, less hemicellulose is recovered suggesting that at higher pH (11.5) bonds between polymers are weakened and cell wall components are further solubilized.

Cellulose content across all forage treatments were significantly different and chemical treatment significantly reduced cellulose content. Additive, rate and concentration effects were also significant. The main areas of interest here were the high rate and addition of NaOH which reduced cellulose. These differences were more pronounced at higher concentrations of hydrogen peroxide.

Lignin values varied considerably between treatments but the treated forage tended to have less lignin and this was more pronounced at the high rather than the low rate.

Crude protein values were significantly different between treatments. The controls were lower in crude protein than treated forage and this was effected by rate and concentration but not additive. Ethanolamine is a primary amine and contains 22.9% nitrogen which translates to 143% crude protein. It is not surprising therefore, that even small applications would result in a considerable increase in crude protein content of poor quality forages.

(B) Dry Matter Degradation (i) The Degradation Model: Parameter Estimation

The degradation of dry matter and its chemical components were assumed to proceed in accordance with the model proposed by E.R. Orskov and J. McDonald (J. Agric. Sci. Comb. 92: 499–503, 1979):

$$dg = a + b(1 - e^{-kt})$$

Figure 2:
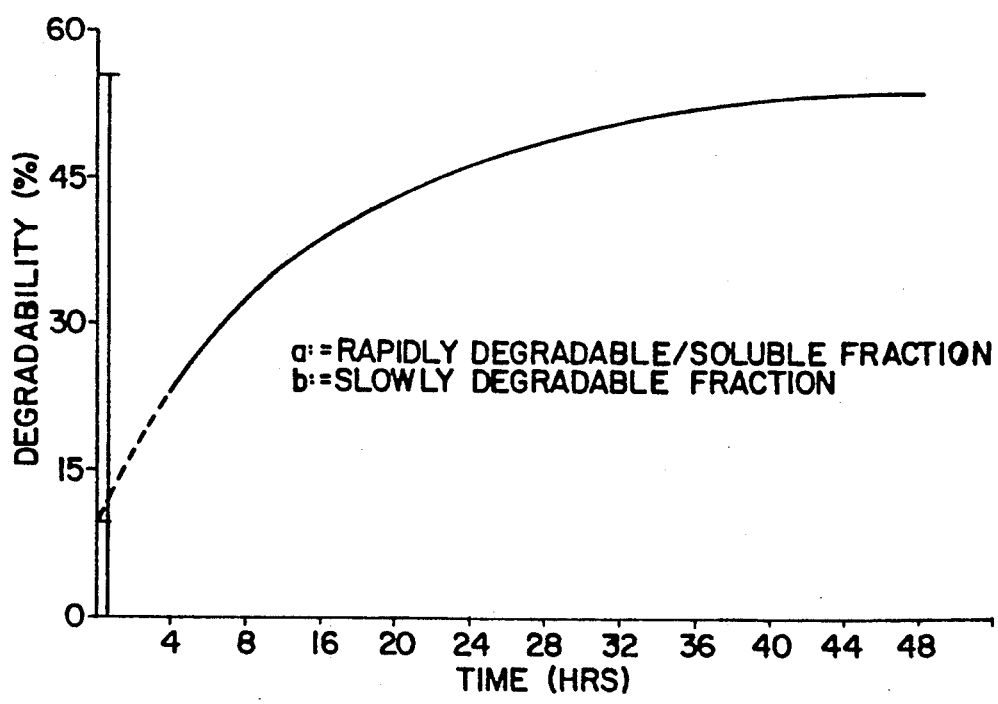
FIG. 2 depicts the degradation of dry matter curve.

The degradation model was fitted to the data by a least squares optimization procedure utilizing a GENSTAT ™ program. Essentially, the program estimates the parameters 'a, b, k', wherein 'a' represents that portion of a forage which is easily degradable, 'b' represents that portion of a forage which slowly degrades and 'k' represents the fractional rate of degradation of 'b', together with their respective standard errors and correlations between them. The parameter estimates were used only to describe the course of degradation of dry matter. This can be explained more clearly in graphical form. (See FIG. 2).

Rate of Passage (Liquid and Particles)

The dilution rate of liquids from the rumen was determined by ruminally infusing a single dose of cobalt EDTA (2.41 g of Co infused) and sampling of rumen fluid at 2, 4, 6, 8, 12, 24 and 48 hours after dosing. Co-EDTA was prepared according to the method of Uden et al (J. Sci. Food Agric. 31: 625, 1980). The concentration of Co in rumen fluid after centrifuging (17000 g for 15 min) was determined by atomic absorption spectroscopy. Dilution rate (%/hr) of rumen fluid was calculated as the slope of the natural log of Co-concentration vs time. Ruminal liquid volume was estimated by dividing Co dosed by the antilog of the intercept at time zero. Turnover time was calculated as the reciprocal of the fractional dilution rate and outflow rate was calculated as the product of volume and fractional dilution rate.

The dilution of particles from the rumen was determined by ruminally infusing a single dose of chromium-mordanted fibre (5.85 g Cr infused) and sampling from different levels within the rumen at 2, 4, 8, 12, 24 and 48 hr after dosing. Chromium fibre was prepared according to the method of Uden et al (1980 op.cit.). The Cr concentration in the particles was determined by digesting 200 mg of ground dried rumen contents with 6 ml of digestion mixture (3.6 ml nitric acid, 2.4 perchloric acid) for 15 min at room temperature, then one hour at 230° C. The resulting mixture was cooled, diluted to 50 ml with distilled water then analysed for Cr by atomic absorption spectroscopy.

The degradation of forage expressed in terms of percentage of dry matter degraded and their respective rate constants and effective degradability are presented in Tables 7, 8 and 9.

From Table 7, negative 'a' fraction estimates signify a lag time between forage entering the rumen and the onset of digestion. Poor quality forage such as straw is characterized by a lag time. The purpose of chemical treatment was to improve the forages so that bacteria could attach and degrade plant tissues more easily. An increase in the 'a' fraction would indicate this but not necessarily confirm it. Quite often treatment removes a portion of the degradable 'b' fraction which then becomes less degradable and at a slower rate. In this experiment, chemical treatment invariably increased both 'a' and 'b' fractions but there is a price to pay which is a slower rate of degradation. The potential degradability represented by (a+b) is the amount of dry matter which could have been degraded if the forage was allowed to remain in the rumen for longer than 48 hr. Forage does not usually stay in the rumen for more than 48 hr. In an attempt to estimate an actual degradability value, Orskov and McDonald (1979, op.cit.) incorporated outflow rate from the rumen into the degradation equation (see Table 7). This represents the

TABLE 7

Proportion of DM (%) Degraded and Rate Constants of Treated and Untreated Barley Straw

| | Parameters Estimates | | | | Effective* |
|---|---|---|---|---|---|
| | a | b | k(%/hr) | (a + b) | Degradability |
| Control | −1.07 | 41.6 | 4.70 | 40.6 | 26.5 |
| 3HPET LR | 0.84 | 51.9 | 2.71 | 52.7 | 28.4 |
| 3HPET HR | 6.0 | 61.1 | 2.45 | 67.0 | 36.9 |
| 5HPET LR | −0.36 | 43.9 | 3.57 | 43.5 | 25.9 |
| 5HPET HR | −0.40 | 41.8 | 5.27 | 41.4 | 28.3 |
| 7HPET LR | 0.72 | 55.9 | 2.38 | 56.6 | 28.6 |
| 7HPET HR | 6.83 | 80.3 | 1.57 | 87.1 | 38.6 |
| 9HPET LR | 0.00 | 49.2 | 3.02 | 49.2 | 27.4 |
| 9HPET HR | 4.21 | 45.0 | 4.55 | 49.2 | 33.7 |
| 3AHP LR | 1.18 | 62.7 | 2.24 | 63.9 | 31.4 |
| 3AHP HR | 9.47 | 74.7 | 1.75 | 84.2 | 41.0 |
| 5AHP LR | 0.32 | 34.2 | 4.48 | 34.5 | −22.6 |
| 5AHP HR | 7.60 | 46.5 | 2.99 | 54.1 | 33.4 |
| 7AHP LR | 0.37 | 44.9 | 4.02 | 45.3 | 28.5 |
| 7AHP HR | 9.27 | 57.3 | 2.84 | 66.6 | 40.3 |
| 9AHP LR | 4.6 | 72.3 | 1.89 | 76.9 | 36.5 |
| 9AHP HR | 8.6 | 58.6 | 3.17 | 67.1 | 42.0 |

*Effective degradability = $a + \frac{bk}{c + k}$ where c = outflow rate from the rumen

TABLE 8

Proportion of DM (%) Degraded and Rate Constants of Treated and Untreated Timothy Hay Parameters Estimates

|  | a | b | k(%/hr) | (a + b) | Effective Degradability |
|---|---|---|---|---|---|
| Control | 10.2 | 67.9 | 3.67 | 78.1 | 51.3 |
| 3HPET LR | 4.4 | 65.7 | 5.10 | 70.1 | 49.1 |
| 3HPET HR | 6.5 | 68.8 | 4.87 | 75.3 | 52.6 |
| 5HPET LR | 6.5 | 72.2 | 3.04 | 78.7 | 46.8 |
| 5HPET HR | 7.1 | 73.2 | 3.61 | 80.3 | 51.1 |
| 7HPET LR | 7.6 | 84.6 | 2.46 | 92.2 | 50.4 |
| 7HPET HR | 11.4 | 74.6 | 3.13 | 86.0 | 53.6 |
| 9HPET LR | 3.7 | 64.0 | 4.20 | 67.7 | 44.4 |
| 9HPET HR | 13.5 | 100* | 1.64 | 100* | 54.1 |
| 3AHP LR | 10.1 | 79.1 | 1.98 | 89.2 | 45.9 |
| 3AHP HR | 16.1 | 80.0 | 1.97 | 96.1 | 52.2 |
| 5AHP LR | 10.6 | 78.4 | 2.25 | 89.0 | 48.5 |
| 5AHP HR | 14.5 | 70.6 | 2.52 | 85.1 | 50.7 |
| 7AHP LR | 9.1 | 69.6 | 3.14 | 78.7 | 48.5 |
| 7AHP HR | 13.4 | 68.7 | 3.63 | 82.1 | 54.8 |
| 9AHP LR | 9.7 | 89.8 | 2.19 | 99.5 | 52.5 |
| 9AHP HR | 14.7 | 90.8 | 2.04 | 100* | 56.4 |

*Maxium cannot exceed 100%

TABLE 9

Proportion of DM (%) Degraded and Rate Constants of Treated and Untreated Alfalfa Parameters Estimates

|  | a | b | k(%/hr) | (a + b) | Effective Degradability |
|---|---|---|---|---|---|
| Control | 6.6 | 61.3 | 7.83 | 67.9 | 53.5 |
| 3HPET LR | 8.9 | 59.3 | 7.00 | 68.2 | 53.1 |
| 3HPET HR | 16.3 | 57.1 | 5.58 | 73.4 | 56.2 |
| 5HPET LR | 11.7 | 56.1 | 5.19 | 67.8 | 50.1 |
| 5HPET HR | 16.0 | 57.4 | 4.54 | 73.4 | 53.5 |
| 7HPET LR | 8.6 | 62.3 | 5.74 | 70.9 | 52.5 |
| 7HPET HR | 14.9 | 60.8 | 5.07 | 75.7 | 56.2 |
| 9HPET LR | 7.1 | 54.4 | 6.69 | 61.5 | 47.1 |
| 9HPET HR | 1.5 | 64.7 | 9.02 | 66.2 | 52.6 |
| 3AHP LR | 12.0 | 57.7 | 4.84 | 69.7 | 50.6 |
| 3AHP HR | 15.7 | 57.6 | 4.84 | 73.3 | 54.2 |
| 5AHP LR | 6.0 | 58.4 | 6.95 | 64.5 | 49.5 |
| 5AHP HR | 13.7 | 60.6 | 4.89 | 74.3 | 54.3 |
| 7AHP LR | 8.2 | 59.7 | 7.21 | 67.9 | 53.0 |
| 7AHP HR | 13.3 | 66.2 | 4.25 | 79.5 | 55.6 |
| 9AHP LR | 12.8 | 62.2 | 4.52 | 75.0 | 53.4 |
| 9AHP HR | 15.4 | 65.6 | 3.93 | 81.0 | 56.1 | effective degradability. In this experiment, the outflow rate of Cr-stained forage particles was 2.45 hr$^{-1}$.

For straw, potential degradability increased from 40.6% (control) to 84.2% (3AHP HR). In many instances, an increase in 'a' and 'b°' was accompanied by a slight decrease in 'k' but the effective degradability increased (Tables 7–9). The results of effective degradability clearly showed that treatment had a more profound effect on straw than on timothy and alfalfa. Effective degradability of straw increased from 26.5% (control) to 41.0% (3AHP HR), for alfalfa the increase was from 51.3% (control) to 56.4% (9AHP HR). This was not unexpected because treatment normally improves a poor quality forage more than a good quality forage.

(ii) Analysis of Variance (ANOVA)

The mean squares of analysis of variance for dry matter degradation are presented in Table 10.

Significant differences were detected for main effects of treatment, rumen incubation time, and forage type and for the interactions: treatment-time, treatment-forage, time-forage, and treatment-time-forage. Treatments identified as better than the control were 3HPET HR, 7HPET HR, 3AHP HR, 7AHP HR and 9AHP HR. However, interactions complicate interpretation of results and the treatment-forage interaction clearly showed that each forage type responded differently to each treatment. This can be expected when the different cellular makeup of different forage types is

TABLE 10

Mean Squares of Analysis of Variance for Dry Matter Degradation

| Source of Variation | d.f. | Mean Square | CV % |
|---|---|---|---|
| Animal stratum | 2 | 2114 | 5.7 |
| Animal · Treatment stratum |  |  | 3.3 |
| Treatment | 16 | 754*** |  |
| Residual | 32 | 42.4 |  |
| Animal · Time stratum |  |  | 4.1 |
| Time | 4 | 81210*** |  |
| Residual | 8 | 221.6 |  |
| Animal · Treatment · Time stratum |  |  | 5.3 |
| Treatment · Time | 64 | 56.5*** |  |
| Residual | 128 | 21.7 |  |
| Animal · Treatment · Time · Forage stratum |  |  | 6.9 |
| Forage | 2 | 59910*** |  |
| Treatment · Forage | 32 | 134.8*** |  |
| Time · Forage | 8 | 1082*** |  |
| Treatment · Time · Forage | 128 | 20.5*** |  |
| Residual | 340 | 12.3 |  |
| Animal · Treatment · Time · Forage · Subsample stratum | 753 | 9.29 | 8.5 |
| Total | 1517 |  |  |

***p 0.05 considered. Looking more closely at the chemical treatments (Table 11) there are a number of significant effects. Mean degradabilities are shown in Table 12 and the high rate and addition of NaOH were clearly more effective. The concentration effect seems to be a function of a lower degradability of the 5% treatment. The forages are very different as might be expected and interactions of forage with rate, concentration and additive were significant. When the forage part of this interaction term was broken down, straw was identified as being very much different from timothy and alfalfa. Furthermore, straw was also different in the way it reacted to additive (increases degradability) and rate (greater increase). From this analysis chemical treatment is more effective on straw than timothy and alfalfa. High rate is more effective than low rate and the use of NaOH additive is only beneficial on straw.

(C) Crude Protein (CP) Degradation

The mean squares of analysis of variance for crude protein degradation are presented in Table 13 and the means for the different treatment effects is presented in Table 14. For CP degradation all main effects and interactions were highly significant. Once again straw was very much different from timothy and alfalfa. However, in this type of experiment where treatments involve the addition of a highly degradable source of CP (ethanolamine) it would be unwise to draw too many conclusions concerning CP degradation.

TABLE 11

Mean Squares of Analysis of Variance for Dry Matter Degradation (Factorial Design)

| Source of Variation | d.f. | Mean Square | CV % |
|---|---|---|---|
| Animal stratum | 2 | 2076 | 5.8 |
| Animal · Time stratum |  |  | 4.1 |
| Time | 4 | 76680*** |  |
| Residual | 8 | 212 |  |
| Animal · Rate · Concentration · |  |  | 3.4 |

TABLE 11-continued

Mean Squares of Analysis of Variance for Dry Matter Degradation (Factorial Design)

| Source of Variation | d.f. | Mean Square | CV % |
|---|---|---|---|
| Additive stratum | | | |
| Rate | 1 | 8654*** | |
| Concentration | 3 | 490*** | |
| Additive | 1 | 311** | |
| Rate · Concentration | 3 | 19 | |
| Rate · Additive | 1 | 20 | |
| Concentration · Additive | 3 | 463*** | |
| Residual | 33 | 45.1 | |
| Animal · Rate · Concentration · Additive · Time stratum | | | 5.4 |
| Rate · Time | 4 | 49 | |
| Concentration · Time | 12 | 43 | |
| Additive · Time | 4 | 86* | |
| Concentration · Additive · Time | 12 | 166* | |
| Residual | 148 | 31.5 | |
| Animal · Rate · Concentration · Additive · Time · Forage stratum | | | 7.0 |
| Forage | 2 | 54520*** | |
| Rate · Forage | 2 | 611*** | |
| Concentration · Forage | 6 | 131*** | |
| Additive · Forage | 2 | 385*** | |
| Time · Forage | 8 | 990*** | |
| Residual | 460 | 16.4 | |

*p 0.05
**p 0.01
***p 0.001

TABLE 12

Table of Means for Dry Matter Degradation (%)

(i) Treatment
Control 35.98

| 3HPETLR | 3HPETHR | 5HPETLR | 5HPETHR | 7HPETLR | 7HPETHR | 9HPETLR | 9HPETH |
|---|---|---|---|---|---|---|---|
| 35.33 | 39.45 | 32.31 | 35.79 | 33.62 | 38.74 | 31.61 | 37.54 |
| 3AHPLR | 3AHPHR | 5AHPLR | 5AHPHR | 7AHPLR | 7AHPHR | 9AHPLR | 9AHPHR |
| 32.51 | 38.50 | 32.07 | 37.04 | 35.07 | 40.32 | 35.97 | 40.34 |

| (ii) Treatment | Time (hr) | Straw | Timothy | Alfalfa |
|---|---|---|---|---|
| Control | 4 | 6.12 | 19.12 | 22.93 |
| | 8 | 11.50 | 27.98 | 35.37 |
| | 16 | 22.27 | 40.25 | 50.34 |
| | 24 | 25.99 | 50.14 | 58.30 |
| | 48 | 36.41 | 66.47 | 66.53 |
| 3HPETLR | 4 | 7.50 | 18.66 | 25.62 |
| | 8 | 9.29 | 23.12 | 30.35 |
| | 16 | 18.12 | 41.08 | 49.87 |
| | 24 | 27.26 | 52.85 | 59.05 |
| | 48 | 38.22 | 63.74 | 65.16 |
| 3HPETHR | 4 | 11.29 | 21.34 | 30.24 |
| | 8 | 18.10 | 24.41 | 32.61 |
| | 16 | 23.56 | 43.49 | 51.20 |
| | 24 | 34.50 | 56.52 | 60.17 |
| | 48 | 47.97 | 67.68 | 68.80 |
| 5HPETLR | 4 | 6.86 | 16.44 | 23.45 |
| | 8 | 8.67 | 19.95 | 28.77 |
| | 16 | 18.05 | 33.26 | 43.98 |
| | 24 | 26.50 | 45.90 | 53.59 |
| | 48 | 35.06 | 61.46 | 62.89 |
| 5HPETHR | 4 | 9.34 | 19.30 | 26.24 |
| | 8 | 11.88 | 24.19 | 33.01 |
| | 16 | 20.87 | 31.84 | 43.54 |
| | 24 | 33.67 | 57.30 | 56.48 |
| | 48 | 36.65 | 65.76 | 66.77 |
| 7HPETLR | 4 | 6.40 | 16.12 | 21.17 |
| | 8 | 9.62 | 21.83 | 31.97 |
| | 16 | 18.13 | 34.81 | 45.63 |
| | 24 | 25.63 | 45.91 | 55.36 |
| | 48 | 38.63 | 66.16 | 66.95 |
| 7HPETHR | 4 | 11.59 | 20.53 | 23.96 |
| | 8 | 17.18 | 27.17 | 39.13 |
| | 16 | 22.91 | 41.72 | 46.54 |
| | 24 | 33.30 | 50.35 | 57.60 |
| | 48 | 48.97 | 69.48 | 70.70 |
| 9HPETLR | 4 | 6.39 | 14.44 | 20.74 |
| | 8 | 9.54 | 20.94 | 28.14 |
| | 16 | 18.38 | 33.62 | 43.21 |
| | 24 | 26.31 | 46.11 | 51.28 |
| | 48 | 37.45 | 58.64 | 58.95 |
| 9HPETHR | 4 | 11.59 | 19.81 | 23.48 |
| | 8 | 18.65 | 26.14 | 30.12 |
| | 16 | 25.66 | 35.89 | 52.75 |
| | 24 | 35.56 | 46.69 | 61.02 |
| | 48 | 43.86 | 68.15 | 63.80 |
| 3AHPLR | 4 | 6.65 | 15.63 | 22.49 |
| | 8 | 12.40 | 23.74 | 30.99 |
| | 16 | 17.12 | 28.09 | 40.08 |
| | 24 | 29.58 | 42.33 | 54.59 |
| | 48 | 42.20 | 58.35 | 63.44 |
| 3AHPHR | 4 | 14.44 | 21.59 | 25.44 |

TABLE 12-continued

Table of Means for Dry Matter Degradation (%)

|  |  |  |  |  |
|---|---|---|---|---|
|  | 8 | 20.66 | 29.51 | 35.04 |
|  | 16 | 24.09 | 35.51 | 44.66 |
|  | 24 | 37.69 | 47.61 | 56.87 |
|  | 48 | 51.57 | 64.94 | 67.67 |
| 5AHPLR | 4 | 4.94 | 17.14 | 20.90 |
|  | 8 | 11.55 | 22.90 | 29.60 |
|  | 16 | 19.94 | 37.14 | 46.03 |
|  | 24 | 20.21 | 41.08 | 53.53 |
|  | 48 | 31.20 | 62.73 | 62.21 |
| 5AHPHR | 4 | 12.09 | 21.25 | 24.76 |
|  | 8 | 17.91 | 27.10 | 32.05 |
|  | 16 | 27.31 | 39.23 | 48.79 |
|  | 24 | 29.26 | 45.63 | 53.82 |
|  | 48 | 43.40 | 64.28 | 68.73 |
| 7AHPLR | 4 | 8.02 | 17.96 | 24.51 |
|  | 8 | 11.06 | 24.05 | 31.98 |
|  | 16 | 22.32 | 34.66 | 49.90 |
|  | 24 | 28.47 | 47.82 | 58.35 |
|  | 48 | 38.64 | 62.82 | 65.52 |
| 7AHPHR | 4 | 15.86 | 23.90 | 24.98 |
|  | 8 | 20.24 | 29.05 | 30.49 |
|  | 16 | 30.43 | 43.09 | 44.84 |
|  | 24 | 37.77 | 54.74 | 57.60 |
|  | 48 | 51.92 | 69.69 | 70.26 |
| 9AHPLR | 4 | 9.97 | 18.27 | 23.91 |
|  | 8 | 13.72 | 23.15 | 30.59 |
|  | 16 | 25.37 | 34.44 | 43.88 |
|  | 24 | 29.51 | 48.33 | 55.44 |
|  | 48 | 47.78 | 67.69 | 67.54 |
| 9AHPHR | 4 | 16.24 | 22.02 | 26.39 |
|  | 8 | 21.03 | 28.62 | 31.75 |
|  | 16 | 30.81 | 38.12 | 43.54 |
|  | 24 | 41.13 | 51.35 | 58.72 |
|  | 48 | 54.08 | 70.88 | 70.37 |

(iii) Mean Degradabilities (%) of Treated Forage

| Rate | LR | HR | | |
|---|---|---|---|---|
|  | 33.56 | 38.47 | | |
| Concentration | 3% | 5% | 7% | 9% |
|  | 36.45 | 34.30 | 36.94 | 36.37 |
| Additive | −NaOH | +NaOH | | |
|  | 35.55 | 36.48 | | |
| Time | 4 | 8 | 16 | 24 | 48 |
|  | 17.75 | 23.62 | 35.16 | 45.42 | 58.12 |
| Forage | Straw | Timothy | Alfalfa | |
|  | 24.22 | 38.87 | 44.96 | |

| Rate | Forage | Straw | Timothy | Alfalfa |
|---|---|---|---|---|
| LR |  | 20.57 | 36.58 | 43.54 |
| HR |  | 27.88 | 41.15 | 46.37 |

| Concentration | Forage | Straw | Timothy | Alfalfa |
|---|---|---|---|---|
| 3% |  | 24.61 | 39.01 | 45.72 |
| 5% |  | 21.27 | 37.69 | 43.95 |
| 7% |  | 24.85 | 40.09 | 45.87 |
| 9% |  | 26.15 | 38.66 | 44.28 |

| Additive | Forage | Straw | Timothy | Alfalfa |
|---|---|---|---|---|
| −NaOH |  | 22.73 | 38.82 | 45.10 |
| +NaOH |  | 25.71 | 38.91 | 44.81 |

| Time | Forage | Straw | Timothy | Alfalfa |
|---|---|---|---|---|
| 4 |  | 9.95 | 19.02 | 24.27 |
| 8 |  | 14.47 | 24.74 | 31.66 |
| 16 |  | 22.69 | 36.62 | 46.15 |
| 24 |  | 31.02 | 48.78 | 56.46 |
| 48 |  | 42.97 | 65.15 | 66.23 |

TABLE 13

Mean Squares of Analysis of Variance for Crude Protein Degradation

| Source of Variation | d.f. | Mean Square | CV % |
|---|---|---|---|
| Animal stratum | 2 | 171.5 | 1.5 |
| Animal · Treatment stratum |  |  | 2.2 |
| Treatment | 16 | 4167*** |  |
| Contrast |  |  |  |
| Control vs Rest | 1 | 5105*** |  |
| Low Rate vs High Rate | 1 | 58410*** |  |
| Residual | 32 | 20.1 |  |
| Animal · Time stratum |  |  | 2.3 |
| Time | 4 | 15330*** |  |
| Residual | 8 | 73.1 |  |
| Animal · Treatment · Time |  |  | 4.9 |

TABLE 13-continued

Mean Squares of Analysis of Variance for Crude Protein Degradation

| Source of Variation | d.f. | Mean Square | CV % |
|---|---|---|---|
| stratum | | | |
| Treatment · Time | 64 | 69.5*** | |
| Residual | 128 | 20.2 | |
| Animal · Treatment · Time · Forage stratum | | | 7.3 |
| Forage | 2 | 31962*** | |
| Contrast | | | |
| Straw vs Rest | 1 | 45085*** | |
| Timothy vs Alfalfa | 1 | 18838*** | |
| Treatment · Forage | 32 | 801*** | |
| Time · Forage | 8 | 2689*** | |
| Treatment · Time · Forage | 128 | 40.8*** | |
| Residual | 339 | 14.84 | |
| Total | 763 | | |

TABLE 14

Table of Means for Crude Protein Degradability (%)

(i) Treatment
Control 42.75

| 3HPETLR | 3HPETHR | 5HPETLR | 5HPETHR | 7HPETLR | 7HPETHR | 9HPETLR | 9HPETHR |
|---|---|---|---|---|---|---|---|
| 44.77 | 61.28 | 43.13 | 58.35 | 45.15 | 64.55 | 48.44 | 66.01 |
| 3AHPLR | 3AHPHR | 5AHPLR | 5AHPHR | 7AHPLR | 7AHPHR | 9AHPLR | 9AHPHR |
| 44.22 | 62.57 | 43.78 | 64.12 | 41.60 | 61.68 | 46.71 | 63.35 |

(ii) Treated Forage

| Rate | Low Rate | High Rate | | |
|---|---|---|---|---|
| | 44.73 | 62.74 | | |
| Concentration | 3% | 5% | 7% | 9% |
| | 53.2 | 52.3 | 53.2 | 56.2 |
| Additive | −NaOH | +NaOH | | |
| | 53.97 | 53.50 | | |

| Rate | Forage | Straw | Timothy | Alfalfa |
|---|---|---|---|---|
| Low Rate | 28.25 | 45.45 | 60.50 | |
| High Rate | 59.13 | 60.17 | 68.92 | |

(D) Cell Component Degradation

The cell components were fractionated into cell contents, hemicellulose and acid detergent fibre (ADF). The ANOVA results are presented in Tables 15, 16 and 17. Mean degradabilities are presented in Table 18.

In general, treatment improved cell content degradability (Table 15) by increasing the availability of cell contents to rumen microorganisms. This could be a result of chemical and/or physical alteration of cell walls to allow rumen microorganisms easier access to cell contents. The rate and additive had more of an effect on straw than on timothy and alfalfa. Rate and additive seemed to have very little effect on alfalfa.

Hemicellulose degradation followed along similar lines to that of cell contents. Once again the treated forages degraded differently according to rate, additive and concentration. Additive was more effective on straw than timothy and alfalfa.

Acid detergent fibre has been widely used as an indicator of nutritive value for forages. It consists mainly of cellulose and lignin and is potentially a large source of fermentable energy.

Rate of application had a positive effect on ADF degradation which signified a direct action of peroxide on chemical bonds between lignin and cellulose and confirmed by a reduction in cellulose/lignin concentration (Tables

TABLE 15

Mean Squares of Analysis of Variance for Cell Contents Degradation

| Source of Variation | d.f. | Mean Square | CV % |
|---|---|---|---|
| Animal stratum | 2 | 183 | 1.5 |
| Animal · Treatment stratum | | | 1.5 |
| Treatment | 16 | 1222*** | |
| Contrast - Control vs Rest | 1 | 375*** | |
| Residual | 32 | 11.6 | |
| Animal · Time stratum | | | 1.8 |
| Time | 4 | 15070*** | |
| Residual | 8 | 56.5 | |
| Animal · Treatment · Time stratum | | | 3.6 |
| Treatment · Time | 64 | 49*** | |
| Residual | 128 | 13.2 | |
| Animal · Treatment · Time · Forage stratum | | | 5.0 |
| Forage | 2 | 39830*** | |
| Contrasts | | | |
| Straw vs Rest | 1 | 76020*** | |
| Timothy vs Alfalfa | 1 | 3649*** | |
| Treatment · Forage | 32 | 495*** | |
| Time · Forage | 8 | 659*** | |
| Treatment · Time · Forage | 128 | 15*** | |
| Residual | 340 | 8.4 | |
| Total | 764 | | |

TABLE 16

Mean Squares of Analysis of Variance for Hemicellulose Degradation

| Source of Variation | d.f. | Mean Square | CV % |
|---|---|---|---|
| Animal stratum | 2 | 1443 | 8.3 |
| Animal · Treatment stratum | | | 5.5 |
| Treatment | 16 | 655*** | |
| Contrast - Control vs Rest | 1 | 246** | |
| Residual | 32 | 37.4 | |
| Animal · Time stratum | | | 6.4 |
| Time | 4 | 58188*** | |
| Residual | 8 | 171 | |
| Animal · Treatment · Time stratum | | | 9.4 |
| Treatment · Time | 64 | 74*** | |
| Residual | 128 | 21.5 | |
| Animal · Treatment · Time · Forage stratum | | | 13.3 |
| Forage | 2 | 16263*** | |
| Contrast | | | |
| Straw vs Rest | 1 | 31358*** | |
| Timothy vs Alfalfa | 1 | 1168*** | |
| Treatment · Forage | 32 | 244*** | |
| Time · Forage | 8 | 788*** | |

TABLE 16-continued

Mean Squares of Analysis of Variance for Hemicellulose Degradation

| Source of Variation | d.f. | Mean Square | CV % |
|---|---|---|---|
| Treatment · Time · Forage | 128 | 43*** | |
| Residual | 340 | 14.5 | |
| Total | 764 | | |

TABLE 17

Mean Squares of Analysis of Variance for Acid Detergent Fibre Degradation

| Source of Variation | d.f. | Mean Square | CV % |
|---|---|---|---|
| Animal stratum | 2 | 1776 | 11.6 |
| Animal · Treatment stratum | | | 7.6 |
| Treatment | 16 | 256*** | |
| Residual | 32 | 44.4 | |
| Animal · Time stratum | | | 8.1 |
| Time | 4 | 55929*** | |
| Residual | | 173.5 | |
| Animal · Treatment · Time stratum | | | 11.3 |
| Treatment · Time | 64 | 57*** | |
| Residual | 128 | 19.7 | |
| Animal · Treatment · Time · Forage stratum | | | 16.2 |
| Forage | 2 | 5323*** | |
| Contrast | | | |
| Straw vs Rest | 1 | 10629*** | |
| Timothy vs Alfalfa | 1 | 17 | |
| Treatment Forage | 32 | 81*** | |
| Time · Forage | 8 | 1162*** | |
| Treatment · Time · Forage | 128 | 20*** | |
| Residual | 340 | 13.6 | |
| Total | 764 | | |

TABLE 18

Means of Cell Component Degradabilities (%)

(a) Cell Contents
(i) Treatment
Control 55.35

| 3HPETLR | 3HPETHR | 5HPETLR | 5HPETHR | 7HPETLR | 7HPETHR | 9HPETLR | 9HPETHR |
|---|---|---|---|---|---|---|---|
| 53.03 | 62.08 | 53.00 | 60.27 | 50.72 | 59.55 | 57.09 | 67.03 |
| 3AHPLR | 3AHPHR | 5AHPLR | 5AHPHR | 7AHPLR | 7AHPHR | 9AHPLR | 9AHPHR |
| 53.75 | 63.12 | 56.04 | 64.68 | 51.86 | 62.05 | 53.66 | 65.28 |

(ii) Treated Forage

| | | | | | |
|---|---|---|---|---|---|
| Rate | Low Rate | High Rate | | | |
| | 53.65 | 63.01 | | | |
| Concentration | 3% | 5% | 7% | 9% | |
| | 58.00 | 58.50 | 56.04 | 60.77 | |
| Additive | −NaOH | +NaOH | | | |
| | 57.85 | 58.80 | | | |
| Forage | Straw | Timothy | Alfalfa | | |
| | 44.56 | 62.56 | 67.85 | | |
| Rate | Forage | Straw | Timothy | Alfalfa | |
| Low Rate | | 34.93 | 58.73 | 67.28 | |
| High Rate | | 54.19 | 66.40 | 68.43 | |
| Additive | Forage | Straw | Timothy | Alfalfa | |
| −NaOH | | 42.34 | 63.25 | 67.95 | |
| +NaOH | | 46.78 | 61.88 | 67.76 | |

(b) Hemicellulose
(i) Treatment
Control 30.79

| 3HPETLR | 3HPETHR | 5HPETLR | 5HPETHR | 7HPETLR | 7HPETHR | 9HPETLR | 9HPETHR |
|---|---|---|---|---|---|---|---|
| 30.14 | 30.41 | 23.25 | 28.20 | 27.55 | 35.14 | 22.34 | 25.39 |
| 3AHPLR | 3AHPHR | 5AHPLR | 5AHPHR | 7AHPLR | 7AHPHR | 9AHPLR | 9AHPHR |
| 25.76 | 28.63 | 23.07 | 25.87 | 30.52 | 33.61 | 31.39 | 32.84 |

(ii) Treated Forage

| | | | | | |
|---|---|---|---|---|---|
| Rate | Low Rate | High Rate | | | |
| | 26.75 | 30.01 | | | |
| Concentration | 3% | 5% | 7% | 9% | |
| | 28.73 | 25.10 | 31.7 | 27.99 | |
| Additive | −NaOH | +NaOH | | | |
| | 27.8 | 28.96 | | | |
| Forage | Straw | Timothy | Alfalfa | | |
| | 19.55 | 31.25 | 34.35 | | |
| Rate | Forage | Straw | Timothy | Alfalfa | |
| Low Rate | | 17.41 | 30.60 | 32.24 | |
| High Rate | | 21.65 | 31.90 | 36.45 | |
| Concentration | Forage | Straw | Timothy | Alfalfa | |
| 3% | | 20.24 | 33.17 | 32.79 | |
| 5% | | 15.89 | 29.32 | 30.08 | |
| 7% | | 22.39 | 31.16 | 41.57 | |
| 9% | | 19.67 | 31.36 | 32.95 | |

(b) Acid Detergent Fibre
(i) Treatment
Control 24.38

| 3HPETLR | 3HPETHR | 5HPETLR | 5HPETHR | 7HPETLR | 7HPETHR | 9HPETLR | 9HPETHR |
|---|---|---|---|---|---|---|---|
| 23.41 | 26.32 | 20.84 | 18.84 | 23.43 | 24.19 | 19.45 | 22.48 |
| 3AHPLR | 3AHPHR | 5AHPLR | 5AHPHR | 7AHPLR | 7AHPHR | 9AHPLR | 9AHPHR |
| 20.84 | 25.52 | 19.04 | 20.61 | 24.35 | 25.66 | 23.72 | 23.87 |

TABLE 18-continued

| Means of Cell Component Degradabilities (%) | | | | |
|---|---|---|---|---|
| (ii) Treated Forage | | | | |
| Rate | Low Rate | High Rate | | |
| | 21.88 | 23.44 | | |
| Concentration | 3% | 5% | 7% | 9% |
| | 24.02 | 19.83 | 24.41 | 22.38 |
| Additive | −NaOH | +NaOH | | |
| | 22.37 | 22.95 | | |
| Forage | Straw | Timothy | Alfalfa | |
| | 17.57 | 25.43 | 24.99 | |
| Concentration | Forage | Straw | Timothy | Alfalfa |
| | | 18.77 | 25.79 | 27.50 |
| | | 14.68 | 22.51 | 22.30 |
| | | 17.64 | 28.27 | 27.31 |
| | | 19.17 | 25.13 | 22.83 |
| Additive | Forage | Straw | Timothy | Alfalfa |
| −NaOH | | 16.51 | 25.39 | 25.21 |
| +NaOH | | 18.62 | 25.47 | 24.76 |

2-4). Additive did not have a significant effect on degradation and this showed that ethanolamine was sufficiently alkaline to activate the peroxide. However, forage-additive differences indicated that straw but not timothy and alfalfa required addition of NaOH.

In conclusion, the results clearly show that chemical treatment alters chemical composition of the forages. Straw appears to be affected more so than the higher quality forages and more responsive to higher application rates and the use of NaOH additive. The energy in straw is locked in the cellular matrix and appears to require a more potent chemical mix. However, when fibre energy is made more available, ethanolamine nitrogen is also available at the site of digestion. This will lead to a more effective use of both fibre and nitrogen.

I claim:

1. A method of improving the nutritive value of forage comprising:
   (a) mixing a composition comprising 0.3-9.0 g of hydrogen peroxide and 0.2-6.0 g of ethanolamine wherein the composition has a pH from 8 to 12, with 100 g of forage, and
   (b) maintaining the composition in contact with the forage at atmospheric pressure for a period of from one to five days.

2. The method of claim 1 wherein the composition further comprises 0.1 to 2.5 g of sodium hydroxide.

3. The method of claim 2 wherein the composition is applied in an amount of 0.3-9 g of hydrogen peroxide, 0.4-4 g of ethanolamine and 0.15-1.5 g of sodium hydroxide per 100 g of the forage.

4. The method of claim 1 wherein the forage is selected from the group consisting of hay and straw.

5. The method of claim 1 wherein the forage is selected from the group consisting of timothy hay, alfalfa hay and barley straw.

6. The method of claim 1 wherein the composition is applied in an amount of 0.3-9 g of hydrogen peroxide and 0.4-4 g of ethanolamine per 100 g of the forage.

7. The method of claim 6 wherein the forage is barley straw.

* * * * *